United States Patent [19]

Gosnell

[11] Patent Number: 4,805,506

[45] Date of Patent: Feb. 21, 1989

[54] SLITTING MACHINE FOR SHEET MATERIAL

[75] Inventor: John R. Gosnell, Wapakoneta, Ohio

[73] Assignee: The Wapakoneta Machine Company, Wapakoneta, Ohio

[21] Appl. No.: 92,443

[22] Filed: Sep. 3, 1987

[51] Int. Cl.$^4$ .......................... B23D 19/06; B26D 1/24
[52] U.S. Cl. ...................................... 83/500; 83/347;
83/507; 83/508.3; 83/664
[58] Field of Search .................. 83/501, 500, 503, 504,
83/507, 508.2, 508.3, 481, 482, 495, 498, 425.4,
664, 345, 347, 492; 241/295

[56] References Cited

U.S. PATENT DOCUMENTS

| | | | |
|---|---|---|---|
| 2,232,765 | 2/1941 | Bliven | 241/295 |
| 2,804,112 | 8/1957 | Schaller | 83/664 |
| 2,804,134 | 8/1957 | Berry et al. | 83/501 |
| 3,503,293 | 3/1970 | Sander | 83/481 |
| 3,645,304 | 2/1972 | Thrasher | 83/508.3 |
| 3,677,122 | 7/1972 | Rautine | 83/347 |
| 4,004,479 | 1/1977 | Bodnar | 83/347 |
| 4,073,208 | 2/1978 | Kirkpatrick | 83/347 |
| 4,195,542 | 4/1980 | Zimmer | . |
| 4,680,851 | 7/1987 | Legg | 83/664 |
| 4,732,337 | 3/1988 | Knecht | 83/664 |

OTHER PUBLICATIONS

Article—"Rotary Slitting with Uncanny Accuracy", published by Cowles Tool Company.

Primary Examiner—Frank T. Yost
Assistant Examiner—Scott A. Smith
Attorney, Agent, or Firm—Jacox & Meckstroth

[57] ABSTRACT

Parallel spaced rotary arbors support a plurality of axially spaced circular slitter knives, and a series of spacer rings precisely locate the slitter knives on each arbor. Each spacer ring includes a rigid carrier ring having three circumferentially spaced undercut cavities which confine corresponding floating gage blocks each having a precision axial width slightly greater than the axial width of the carrier ring. The carrier rings on each arbor are rotatably aligned by a keyway and include a pair of flat ring sections each having circumferentially spaced tapered holes which mate with corresponding chamfered surfaces on the gage blocks. The ring sections are secured together by screws or spot welds, and the wider spacer rings have corresponding core rings confined between the ring sections.

21 Claims, 1 Drawing Sheet

SLITTING MACHINE FOR SHEET MATERIAL

BACKGROUND OF THE INVENTION

In the art of machines for slitting webs or sheets of metal or other materials, it is common to use a set of upper and lower rotary shafts or arbors each of which supports a series of circular slitting knives. The knives are spaced axially on each arbor by spacing collars to obtain predetermined axial spaces between adjacent knives. In order to obtain precision spacing between adjacent knives, flat annular shims are inserted between the spacing collars and the knies or between adjacent spacing collars. Usually, the shims are die cut from thin plastic sheet material, but the shims may also be constructed of metal in order to be temporarily retained by magnetics recessed within the spacing collars, for example, as disclosed in U.S. Pat. No. 4,195,542.

It is well known that substantial set-up time is required to assemble a set of rotary slitter knives on a pair of arbors with the use of spacers and shims and to obtain precision spacing between adjacent knives. More precise spacing has been obtained in recent years by the use of shimless systems which eliminate the need for the thin plastic or metal shims. In a shimless system, a series of spacing collars are ground with precise axial widths, for example, within tolerances of plus or minus one micron (0.000040 inch). However, this precision grinding and lapping of the spacer collars increases the cost of the collars. Furthermore, the precision spacing collars for a shimless set-up must be carefully handled to avoid any possible damage to the precision parallel surfaces on the spacer collars.

Another form of spacing the rotary or circular knives on each arbor of a slitting machine is disclosed in U.S. Pat. No. 2,804,134. In this patent, adjacent slitter knives are spaced on the arbor by a set of rods or pins which are precisely ground to length or diameter. The rods or pins are carried by a resilient stripper ring which has a radial cut so that the stripper ring may be deformed to an open position for mounting the ring on the shaft or arbor. The lengths of the rods or pins correspond to the desired spacing between adjacent slitter knives so that opposite ends of each rod or pin engage or contact the adjacent slitter knives. In order for the slitting machine to slit strips of various widths, there must be either a large inventory of the resilient stripper rings or the stripper rings must be made for each set-up.

SUMMARY OF THE INVENTION

The past invention is directed to a machine for slitting a web or sheet of material and which incorporates an improved shimless system for spacing the rotary slitting knives on each of the support arbors. The knife spacer system of the invention is not only economical to manufacture, but also provides for obtaining any desired spacing between adjacent knives with sub-micron accuracy and with minimum set-up time.

In accordance with one embodiment of the invention, the above advantages and features are provided by knife spacer members or rings each of which includes a rigid carrier ring having a keyway for receiving a key projecting from the arbor to prevent relative rotation between the spacer rings and the arbor. Each of the carrier rings includes a pair of mating flat ring sections which are secured together and have three circumferentially spaced frusto-conical or tapered openings or holes to form a set of three undercut cavities within the carrier ring. A circular gage block is confined within each of the undercut cavities by chamfered surfaces mating with the tapered surfaces, and each gage block has precision parallel surfaces which are ground and lapped within sub-micron tolerances. The width of each gage block is slightly greater than the width of the carrier ring, and each gage block is free to float slightly within its corresponding circular cavity. The ring sections of the thinner spacer rings are secured together, for example, by spot welds, and the ring sections of the wider spacer rings are secured by welds or screws to a core ring which has circumferentially spaced cylindrical holes which cooperate to define the undercut cavities.

Other features and advantages of the invention will be apparent from the following description, the accompanying drawing and the appended claims.

DESCRIPTION OF THE PREFERRED EMBODIMENT

Figure 1:
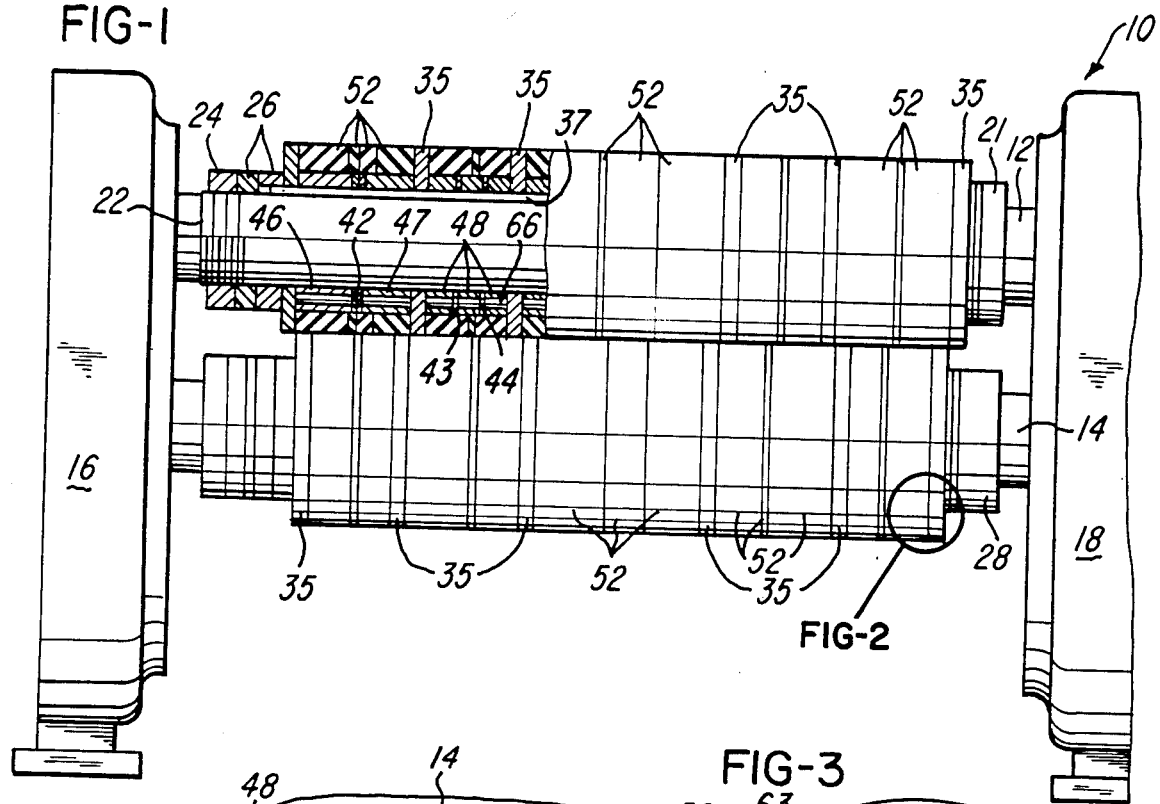
FIG. 1 is an elevational view of a slitting machine incorporating slitter knife spacer rings constructed and assembled in accordance with the invention, and with a housing portion of the machine broken away.

FIG. 1 shows a slitting machine 10 which includes an upper horizontal shaft or arbor 12 and a parallel spaced lower shaft or arbor 14 which are rotatably supported by anti-friction bearings (not shown) located within end support stands or housings 16 and 18. The housing 18 also encloses a drive (not shown) for rotating the arbors 12 and 14 in opposite directions at pre-selected adjustable speeds. The upper arbor 12 has one end portion with an enlarged shoulder-forming collar 21, and the opposite threaded end portion 22 of the arbor 12 receives a large annular nut 24 and a set of spacer collars 26. Similarly, the lower arbor 14 includes an enlarged shoulder-forming collar 28 on one end portion, and the opposite end portion receives an annular nut 24 and a set of spacer collars 26.

As also shown in FIG. 1, a set of circular or annular slitter knives 35 are mounted on each of the arbors 12 and 14, and each of the knives 35 has a keyway for receiving an axially extending key 37 projecting outwardly from the arbor to prevent relative rotation between each set of knives 35 and its supporting arbor. For example, the smaller diameter (e.g. 6″) slitter knives (not shown) may have a thickness of 0.125 inch while the larger diameter (e.g. 12″) slitter knives 35 may have a thickness of 0.500 inch.

In accordance with the present invention, the slitter knives 35 are precisely spaced on each of the arbors 12 and 14 by a series of stackable spacer rings such as a set of relatively thin spacer rings 42, 43 and 44 and a set of wider or thicker spacer rings 46, 47 and 48. Surrounding the spacer rings 42–44 and 46–48 and between the slitter knives 35 on each arbor, are a set of resilient stripper rings which are formed of synthetic rubber material such as Buna-N or Neopreme material. The stripper rings 52 have an outer diameter substantially the same as the outer diameter of the slitter knives 35 and are selected from a supply of stripper rings having various predetermined thicknesses so that the axial length or width of an assembly of stripper rings 52 between each set of adjacent knives 35 corresponds with the selected spacing between the knives.

Figure 2:
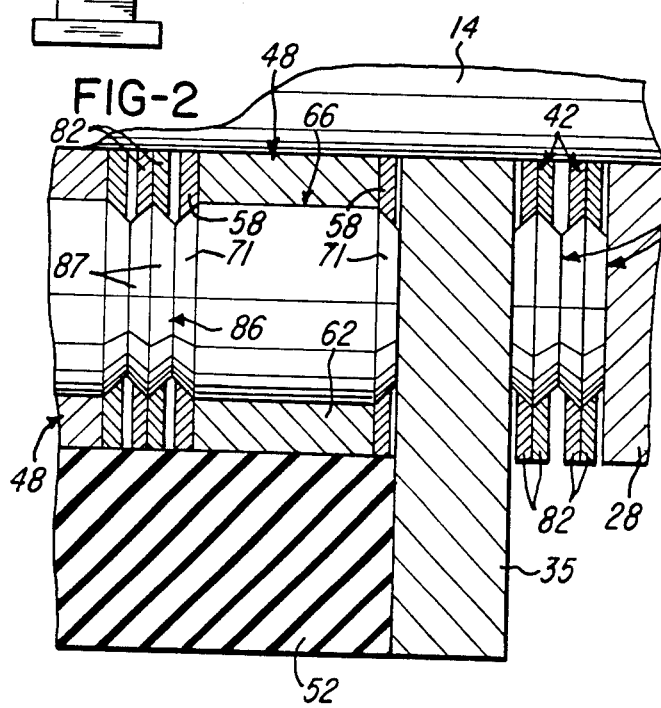
FIG. 2 is an enlarged fragmentary section of a portion of a slitter knife and spacer ring assembly used on the machine shown in FIG. 1.
Figure 3:
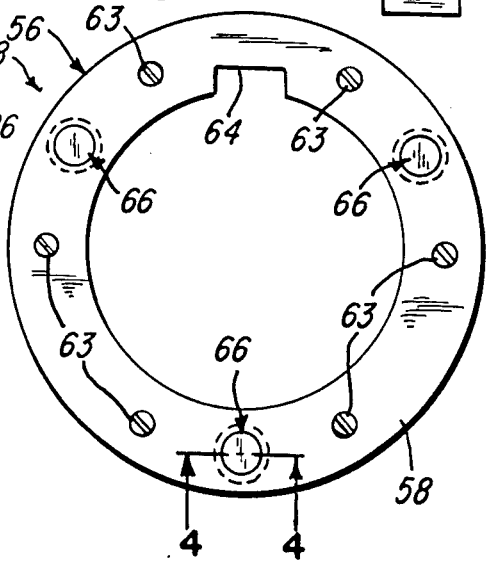
FIG. 3 is an axial view of one of the spacer rings shown in FIG. 2.
Figure 4:
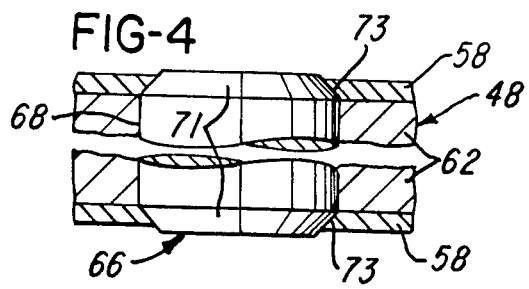
FIG. 4 is a fragmentary section taken generally on the line 4—4 of FIG. 3.
Figure 5:
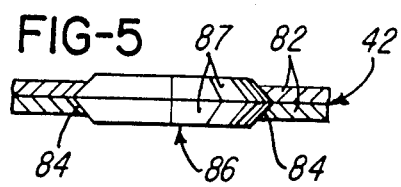
FIG. 5 is a fragmentary section similar to FIG. 4 and illustrating the construction of a thinner spacer ring in accordance with the invention.

Referring to FIGS. 2-5 which illustrate the detail construction of a spacer ring constructed in accordance with the invention, the wide spacer ring 48 includes a carrier ring 56 which is formed by a pair of relatively thin flat metal ring sections 58 secured to opposite sides of a metal core ring 62 by a set of circumferentially spaced screws 63 (FIG. 3). The core ring 62 and the ring sections 58, forming the carrier ring 56, are provided with a keyway 64 for receiving the key 37 projecting from the supporting arbor so that all of the spacer rings on an arbor are in the same rotational alignment with respect to the arbor.

As shown in FIG. 3, the metal carrier ring 56 supports a set of three cylindrical gage blocks 66 which are uniformly spaced and are retained within corresponding undercut cavities formed in part by axially extending bores 68 within the core ring 62. Each of the three gage blocks 66 has beveled or chamfered end surfaces 71 which mate with the corresponding tapered openings or holes 73 formed within each of the ring sections 58. Thus the tapered holes 73 within the ring sections 58 cooperate with corresponding bores 68 within the core ring 62 to form the undercut cavities which confine or capture the gage blocks 66. Each of the gage blocks 66 is free to move or float slightly within its corresponding cavity, and the precision axial length of each gage block is slightly greater than the overall thickness of the assembled core ring 62 and ring sections 58.

As indicated above, the spacer rings are selected from a supply of rings which have predetermined widths corresponding to the precision axial length of the gage blocks. For example, the wider gage blocks 46-48 may be selected from a supply of spacer rings wherein the axial widths of the gage blocks include 0.300 inch, 0.600 inch, 1.000 inch, 2.000 inch, 3.000 inch and 5.000 inch. Precision cylindrical gage blocks are available from various sources in the United States and in different grades according to the desired tolerances. For example, one grade may have sub-micron tolerances of plus or minus 0.000001 inch and another grade may have tolerances ranging from plus 0.000006 to minus 0.000002. The gage blocks are available with axial widths ranging from 0.100 inch to 12 inches. Within the range of 0.300 inch to 5.000 inch, the wider spacer rings constructed in accordance with the invention may use outer ring sections having the same thicknesses, for example, a thickness of 0.095 inch. The axial width of the core ring is selected so that the parallel end surfaces of the gage blocks project slightly from the outer surfaces of the ring sections 58.

The thinner spacer rings 42-44 are constructed similar to the wider spacer rings described above in connection with FIGS. 3 and 4, but without the core ring 62. For example, the spacer ring 42, shown in FIG. 5, includes a pair of flat ring sections 82 which are constructed substantially the same as the ring sections 58, but from a thinner steel plate or sheet. For example, each ring section 82 may have a thickness of 0.045 inch with each ring section having three circumferentially spaced tapered holes or openings 84. A pair of ring sections 82 are secured together, for example, by screws or spot welds so that the openings 84 cooperate to define three undercut cavities for receiving corresponding gage blocks 86 which have frusto-conical or chamfered surfaces 87 conforming to the tapered openings 84. A slight clearance is provided between the mating tapered surfaces so that each gage block 86 is free to float slightly within the undercut cavity defined by the surfaces 84.

The plates 82 may be used for supporting gage blocks 86 within a predetermined range of thicknesses, for example, having thickness of 0.120 inch, 0.130 inch, 0.160 inch and 0.200 inch. The gage blocks 86 may be economically formed from commercially available cylindrical gage blocks having widths with sub-micron tolerances as mentioned above in connection with the gage blocks 66. In spacer rings having gage blocks 86 within a smaller width range, for example, between 0.100 inch and 0.110 inch, the ring sections 82 may be formed from thinner sheet or plate, for example, steel plate having a thickness of 0.045 inch.

From the drawing of the above description, it is apparent that a slitting machine incorporating slitter knives spaced apart with spacer rings constructed in accordance with the present invention, provides desirable features and advantages. For example, the spacer rings of the invention may be economically produced by provide for extremely accurate spacing since the gage blocks are made with parallel sides or surfaces within sub-micron tolerances. In addition, the keyway 64 within each spacer ring provides for axial alignment of all of the spacer rings on a supporting arbor so that various combinations or selections of spacer rings may be mounted on the arbor between adjacent slitter knives to obtain the desired precision spacing between the knives. In addition, the flat carrier ring sections 58 and 82 provide protection for the precision gage blocks confined within the undercut openings or cavities so that the gage blocks are less likely to be damaged during handling of the spacer rings. The carrier ring sections also provide for supporting the gage blocks in a manner which permits slight universal floatation of each gage block. Thus when the spacer rings are positioned on an arbor in a stack relation between adjacent slitter knives, as illustrated in FIGS. 1 and 2, the precision parallel surfaces of the gage blocks cooperate to provide for precision parallel spacing of the slitter knives when the assembly of the slitter knives and spacer rings are clamped axially on the supporting arbor by tightening of the corresponding nut 24. The rotational alignment of the spacer rings by means of the keyway 64 and the resulting axial alignment of the corresponding gage blocks permit the selection of various combinations of spacer rings having gage blocks of different widths in order to obtain the desired spacing between adjacent slitter knives. The outer cylindrical surfaces of the ring sections and core rings of the spacer rings also provide a support for the resilient stripper rings 52 which are also selected from a supply and stacked between adjacent slitter knives 35 according to the spacing between the adjacent knives.

While the forms of spacer rings herein described constitutes preferred embodiments of the invention, it is to be understood that the invention is not limited to these precise forms of spacer rings, and that changes may be made therein without departing from the scope and spirit of the invention as defined in the appended claims.

The invention having thus been described, the following is claimed:

1. An improved spacer member for use in a slitting machine for precisely spacing a set of circular slitter knives on an arbor, said spacer member comprising a substantially rigid carrier ring having a predetermined axial width, said carrier ring being continuous and uninterrupted in a circumferential direction, a set of at least three gage blocks carried by said carrier ring at circumferentially spaced locations, each of said gage blocks having precisely parallel surfaces, the width of each said gage block in an axial direction between said parallel surfaces being highly precise and slightly greater than the axial width of the supporting said carrier ring, means for retaining each of said gage blocks within the supporting said carrier ring with said carrier ring providing protection for said gage blocks, and means for securing said carrier ring to the supporting arbor and providing for axial alignment of the corresponding said gage blocks on a series of said carrier rings on the arbor between each pair of adjacent knives.

2. A spacer member as defined in claim 1 wherein said carrier ring defines a corresponding set of circumferentially spaced undercut cavities, and each of said gage blocks has an enlarged center portion projecting into the corresponding said cavity to confine said gage block within said cavity.

3. A spacer member as defined in claim 2 wherein said carrier ring comprises a pair of mating flat ring sections, and each of said ring sections has means defining circumferentially spaced tapered openings cooperating to form said undercut cavities.

4. A spacer member as defined in claim 3 wherein each of said gage blocks is circular and has frusto-conical chamfered surfaces adjacent said tapered openings.

5. A machine as defined in claim 3 wherein said carrier ring includes a core ring disposed between said flat ring sections, said core ring having corresponding cylindrical bores aligned with said tapered openings for receiving said center portions of said gage blocks, and means for securing said ring sections to opposite sides of said core ring.

6. In a machine for slitting a web or sheet of material, including a set of parallel spaced arbors supported for rotation on parallel axes, a plurality of circular slitter knives mounted on each of said arbors, means for securing said slitter knives on each said arbor to said arbor for rotation with said arbor, and a series of spacer members mounted on each of said arbors between said slitter knives, the improvement wherein said spacer members comprise a predetermined set of carrier rings disposed between each pair of adjacent said slitter knives on each said arbor, each said carrier ring being continuous and uninterrupted in a circumferential direction, a set of at least three gage blocks carried by each said carrier ring at circumferentially spaced locations, each of said gage blocks having precisely parallel surfaces, means for retaining each of said gage blocks within the supporting said carrier ring, the axial width of each gage block between said parallel surfaces being slightly greater than the axial width of the supporting said carrier rings keyway means for securing each set of said carrier rings to the supporting said arbor and providing for rotational alignment of all of said carrier rings between each pair of said slitter knives, and said keyway means having the same circumferential location on each said carrier ring with respect to the corresponding said gage blocks to assure precise axial alignment of corresponding said gage blocks between each pair of said slitter knives.

7. A slitting machine as defined in claim 6 wherein each of said carrier rings defines a corresponding set of circumferentially spaced undercut cavities, and each of said gage blocks has an enlarged center portion projecting into the corresponding said cavity to confine said gage block within said cavity.

8. A slitting machine as defined in claim 7 wherein each of said carrier rings comprise a pair of mating flat ring sections, and each of said ring sections has means defining circumferentially spaced tapered openings cooperating to form said undercut cavities.

9. A slitting machine as defined in claim 8 wherein each of said gage blocks is circular and has frusto-conical chamfered surfaces adjacent said tapered openings.

10. A slitting machine as defined in claim 8 wherein each of said carrier rings includes a core ring disposed between said pair of flat ring sections, said core ring having corresponding cylindrical bores aligning with said tapered openings for receiving said center portions of said gage blocks, and means for securing said ring sections to opposite sides of said core ring.

11. A slitting machine as defined in claim 6 wherein said means for securing each of said carrier rings to the supporting said arbor comprise keyway means within said carrier rings.

12. A slitting machine as defined in claim 6 wherein three of said gage blocks are retained by said carrier ring at uniformally spaced circumferential locations.

13. A slitting machine as defined in claim 6 wherein each said carrier ring includes means defining circumferentially spaced circular holes, each of said gage blocks being circular with one of said gage blocks in each of said holes, and each of said gage blocks having chamfered end surfaces adjacent said parallel surfaces.

14. A slitting machine as defined in claim 13 wherein each of said carrier rings comprise a pair of flat ring sections each having tapered holes mating with said chamfered end surfaces on said gage blocks.

15. A slitting machine as defined in claim 6 and including a resilient stripper ring surrounding each of said carrier rings.

16. In a machine for slitting a web or sheet of material, including a set of parallel spaced arbors supported for rotation on parallel axes, a plurality of circular slitter knives mounted on each of said arbors, means for securing said slitter knives on each said arbor to said arbor for rotation with said arbor, and a series of spacer members mounted on each of said arbors between said slitter knives, the improvement wherein said spacer members comprise a predetermined set of substantially rigid carrier rings disposed between each pair of adjacent and slitter knives on each said arbor, each said carrier ring being continuous and uninterrupted in a circumferential direction, a set of at least three gage blocks carrier by each said carrier ring at circumferentially spaced locations, each of said gage blocks having precisely parallel surfaces, means for retaining each of said gage blocks within the supporting said carrier, the axial width of each said gage block between said parallel surfaces being slightly greater than the axial width of the supporting said carrier ring, keyway means for securing each set of said carrier rings to the supporting said arbor and providing for rotational alignment of all of said carrier rings between each pair of said slitter knives, and said keyway means having the same circumferential location on each said carrier ring with respect to the corresponding said gage blocks to assure precise axial alignment of corresponding said gage blocks between each pair of said slitter knives.

17. A slitting machine as defined in claim 16 wherein each of said carrier rings defines a corresponding set of circumferentially spaced undercut cavities, and each of said gage blocks has an enlarged center portion projecting into the corresponding said cavity to confine said gage block within said cavity.

18. A slitting machine as defined in claim 17 wherein each of said carrier rings comprise a pair of mating flat ring sections, and each of said ring sections has been defining circumfentially spaced tapered openings cooperating to form said undercut cavities.

19. A slitting machine as defined in claim 18 wherein each of said gage blocks is circular and has frusto-conical chamfered surfaces adjacent said tapered openings.

20. A slitting machine as defined in claim 18 wherein each of said carrier rings includes a core ring disposed between said pair of flat ring sections, said core ring having corresponding cylindrical bores aligning with said tapered openings for receiving said center portions of said gage blocks, and means for securing said ring sections to opposite sides of said core ring.

21. A slitting machine as defined in claim 16 and including a resilient stripper ring surrounding each of said carrier rings.

* * * * *